(12) United States Patent
McCune, Jr.

(10) Patent No.: US 9,179,508 B2
(45) Date of Patent: Nov. 3, 2015

(54) SOLID-STATE LIGHTING DIMMING (71) Applicant: Earl W. McCune, Jr., Santa Clara, CA (US)

(72) Inventor: Earl W. McCune, Jr., Santa Clara, CA (US)

(*) Notice: Subject to any disclaimer, the term of this patent is extended or adjusted under 35 U.S.C. 154(b) by 0 days.

(21) Appl. No.: 14/152,089

(22) Filed: Jan. 10, 2014

(65) Prior Publication Data

US 2015/0201470 A1 Jul. 16, 2015

(51) Int. Cl.
*H05B 33/08* (2006.01)
(52) U.S. Cl.
CPC ........ *H05B 33/0809* (2013.01); *H05B 33/0845* (2013.01)
(58) Field of Classification Search
CPC ........... H05B 33/0815; H05B 33/0833; H05B 33/0845; H05B 33/0809; H05B 33/0827; H05B 33/086; H05B 39/044
USPC .............. 315/127, 192, 186, 291, 297, 200 R
See application file for complete search history.

(56) References Cited

U.S. PATENT DOCUMENTS

| | | | |
|---|---|---|---|
| 7,852,017 B1* | 12/2010 | Melanson ................. | 315/291 |
| 8,405,465 B2* | 3/2013 | McCune, Jr. .............. | 332/109 |
| 8,497,637 B2* | 7/2013 | Liu ........................... | 315/225 |
| 8,710,754 B2* | 4/2014 | Baddela et al. ............ | 315/192 |
| 8,710,755 B2* | 4/2014 | Chen et al. ................ | 315/200 R |
| 8,760,078 B2* | 6/2014 | McCune, Jr. .............. | 315/297 |
| 8,884,537 B2* | 11/2014 | Liao et al. ................. | 315/200 R |
| 2010/0270942 A1* | 10/2010 | Hui et al. .................. | 315/291 |
| 2011/0273098 A1* | 11/2011 | Grajcar .................... | 315/186 |
| 2011/0291591 A1* | 12/2011 | Shiu et al. ................. | 315/297 |
| 2012/0126909 A1* | 5/2012 | McCune, Jr. .............. | 332/109 |
| 2012/0161665 A1* | 6/2012 | Thornton .................. | 315/291 |
| 2013/0114241 A1* | 5/2013 | van de Ven et al. ....... | 362/84 |
| 2013/0300303 A1* | 11/2013 | Liu ........................... | 315/200 R |
| 2014/0028193 A1* | 1/2014 | Chiang et al. ............. | 315/127 |

* cited by examiner

*Primary Examiner* — Vibol Tan
(74) *Attorney, Agent, or Firm* — Patent Law Professionals, P.C.; William E. Winters (57) ABSTRACT

A solid-state lighting (SSL) system having dimming capability includes an SSL driver having a current control circuit configured to control current flow and, consequently, the brightness of light emitted by a light-emitting load. The magnitude of current flowing through the light-emitting load is set and controlled depending on a dim control signal, which is generated based on the value of a scaled alternating current (AC) power signal. The scaled AC power signal is generated by an AC scaling unit, which scales an input AC power signal provided by an AC power source. The extent to which the input AC power signal is scaled determines the value of the dim control signal and, consequently, the magnitude of current flow and resultant dimming of the light-emitting load. Pulse-width modulation of the light-emitting load current may be optionally combined with the current-control-based dimming to widen the overall dimming range.

19 Claims, 6 Drawing Sheets

SOLID-STATE LIGHTING DIMMING

FIELD OF THE INVENTION

The present invention relates in general to solid-state lighting (SSL) systems, and in particular to dimming light emitted by light-emitting devices of SSL systems.

BACKGROUND OF THE INVENTION

Solid-state lighting (SSL) is rapidly becoming a dominant lighting technology and is expected to largely displace most other conventional lighting technologies, such as incandescent and fluorescent lighting, in the not too distant future. SSL is a superior lighting technology since it employs light-emitting diodes (LEDs), which are energy efficient, long-lasting, and durable.

Although SSL technology is superior to conventional lighting technologies in many respects, one well-known problem with its use relates to the ability to dim the light produced by the LEDs. Dimming is desirable since it helps conserve energy. It also allows the ambiance of an environment to be altered. Unfortunately, because LEDs are nonlinear devices, the conventional analog dimmer switches commonly found in homes and offices to control dimming of conventional incandescent lighting sources cannot be used to directly control dimming in SSL systems.

Another approach which has proved to be useful in controlling dimming in SSL systems is pulse-width modulation (PWM) based dimming. In PWM-based dimming periodic control signals containing sequences of pulses are generated and modulated to control how often the LEDs in the SSL system conduct and thereby produce light. By reducing the durations (i.e., "widths") of the pulses in the control signals, the ratio of time in which the LEDs are configured in a conducting/light-producing state to the time they are configured in a non-conducting/no-light-producing state (this ratio often being referred to as the "duty cycle") is reduced. This duty cycle reduction is perceived by the human eye and brain as a dimming of the light.

PWM-based dimming can be a useful approach to dimming LEDs in SSL systems. However, under some circumstances it can undesirably produce flicker and electromagnetic interference (EMI). Flicker, is particularly perceptible when the duty cycles of the control signal are low, and it can cause or induce headaches, blurred vision, eyestrain and other health-related discomforts and disorders. EMI can also be problematic since it can interfere with reception in radios and degrade the performance of other electronic devices. Additionally, PWM-based dimming is capable of dimming only over a limited dynamic range. The ability to dim over a wide dynamic range and to very low dim levels requires the ability to adjust the PWM control signals so that they have very narrow pulses. However, generating very narrow pulses and designing driver circuitry capable of responding to very narrow pulses is difficult and in some circumstances even impracticable.

BRIEF SUMMARY OF THE INVENTION

Systems and methods for controlling dimming in solid-state lighting (SSL) systems are disclosed. An exemplary SSL system includes an alternating current (AC) scaling unit; an alternating current to direct current (AC/DC) converter; a dim control signal generating circuit; and an SSL driver. The AC scaling unit is configured to scale an AC input voltage provided by an AC power source, which may be, for example, the AC mains. This scaled AC waveform provides both the power into the SSL driver and also is the dimming control for the SSL driver. The AC/DC converter, which may be a component of the SSL driver or external to the SSL driver, converts the scaled AC voltage to a DC voltage, which is then used to generate a regulated DC supply for powering a light-emitting load connected to the output of the SSL driver. The dim control signal generating circuit, which also may be included within or external to the SSL driver, operates to generate a dim control signal based on the scaled AC voltage. Dim control circuitry in the SLL driver, which in one embodiment comprises a current control circuit (such as a controlled current source, for example) adjusts the magnitude of the current flowing through the light-emitting load, depending on the value of the dim control signal. The lower the value of the dim control signal, the lower the magnitude of current that flows through the light-emitting load. Because the brightness of the light emitted by the light-emitting load is dependent upon the magnitude of the current flowing through it, scaling the AC input and producing a dim control signal that varies the magnitude of current flowing through the light-emitting load allows dimming to be realized over a range of dimming values, even though the SSL driver is designed to regulate its output in spite of any variations on the AC input. Controlling current and dimming according to this "current control" approach is simple, requiring very few electrical components. It also beneficially results in no flicker and minimal electromagnetic interference (EMI).

To extend dimming to even lower light levels, the dim control circuitry may further include pulse-width modulation (PWM) circuitry. According to this embodiment of the invention, current control based dimming is performed to achieve dimming over a first dimming range and PWM is configured to perform dimming over a second dimming range that extends below the lower end of the current control dimming range. Combining PWM-based dimming with the current-control-based dimming thus widens the overall dimming range beyond that which can be achieved using either approach alone. Including PWM-based dimming also affords the ability to extend the dimming range to levels that can be difficult or impracticable to realize using the current control approach by itself, making this embodiment of the invention particularly attractive in circumstances where very low light levels are needed or desired, such as in a movie theater, for example. Since PWM-based dimming is only performed at low power levels, EMI-related problems often caused by prior art PWM-based lighting systems are substantially avoided. Finally, since PWM-based dimming is initiated only after the magnitude of the current flowing through the one or more light-emitting devices $108\text{-}1, 108\text{-}2, \ldots, 108\text{-}n$ has been reduced to a low value, low-duty cycles are not needed to extend dimming to low light levels. Since PWM-based flicker is most perceptible when duty cycles are low, health related concerns due to PWM-based flicker are therefore significantly reduced.

Further features and advantages of the invention, including descriptions of the structure and operation of the above-summarized and other exemplary embodiments of the invention, will now be described in detail with respect to accompanying drawings, in which like reference numbers are used to indicate identical or functionally similar elements.

DETAILED DESCRIPTION

Figure 1:
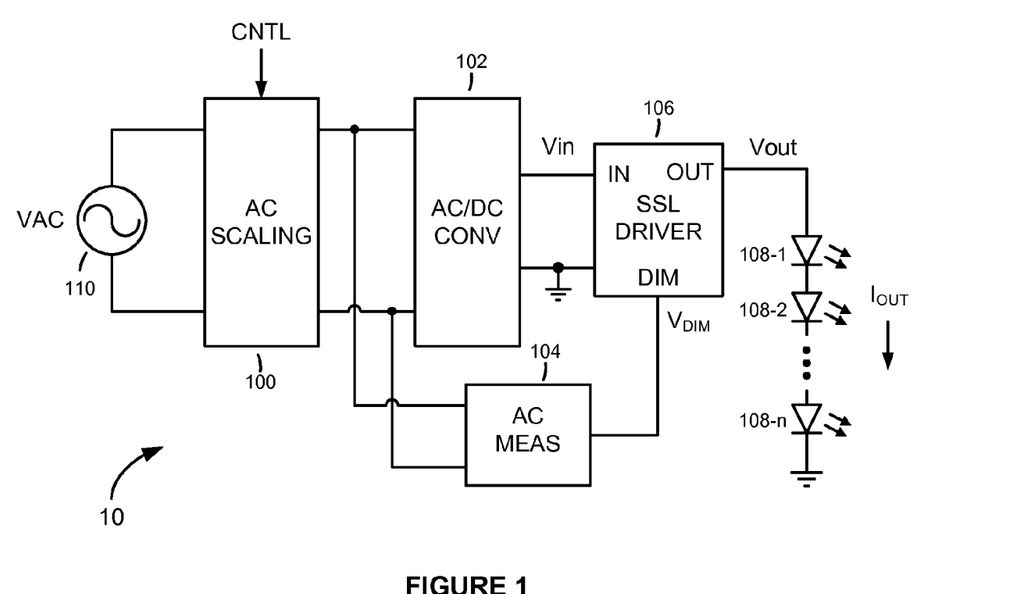
FIG. 1 is a drawing of a solid-state lighting (SSL) system with dimming capability, according to an embodiment of the present invention.

Referring to FIG. 1, there is shown a solid-state lighting (SSL) system 10 with dimming capability, according to an embodiment of the present invention. The SSL system 10 comprises an alternating current (AC) scaling unit 100, an alternating current to direct current (AC/DC) converter 102, an AC measuring unit 104, an SSL driver 106, and one or more light-emitting devices (e.g., light-emitting diodes (LEDs)) 108-1, 108-2, ..., 108-n. The AC scaling unit 100 is connected between an AC power source 110 (such as the AC mains, for example) and the AC/DC converter 102, and is configured to scale the AC input voltage VAC supplied by the AC power source 110 to a scaled voltage determined by a scaling control signal CNTL. The AC/DC converter 102 is connected between the AC scaling unit 100 and the SSL driver 106, and serves to convert the scaled AC voltage produced at the output of the AC scaling unit 100 to a DC voltage Vin, which is applied to the input IN of the SSL driver 106. The AC measuring unit 104 is configured in a separate AC measurement path, between the output of the AC scaling unit 100 and the SSL driver 106. It is configured to measure the scaled AC voltage produced by the AC scaling unit 100 (for example, the scaled AC voltage's amplitude, peak-to-peak value or root-mean square (RMS) value) and produce a dim control signal $V_{DIM}$, which is applied to a dim control input DIM of the SSL driver 106. The value of the dim control signal $V_{DIM}$ depends on the value of the scaled AC voltage produced by the AC scaling unit 100. Hence, as the scaling control signal CNTL is adjusted to scale the AC input voltage VAC down to a lower value, the AC measuring unit 104 adjusts the dimming signal $V_{DIM}$ down, correspondingly. Depending on its specific design and configuration, the SSL driver 106 responds to the dimming signal $V_{DIM}$ by either reducing and restricting the output current $I_{OUT}$ available to the one or more light-emitting devices 108-1, 108-2, ..., 108-n or by lowering the output voltage $V_{OUT}$ so that the output current $I_{OUT}$ flowing through the one or more light-emitting devices 108-1, 108-2, ..., 108-n is reduced. In either approach, the reduced output current $I_{OUT}$ results in dimming of the light produced by the one or more light-emitting devices 108-1, 108-2, ..., 108-n.

The various components of the SSL system 10 may be implemented using discrete devices, one or more integrated circuit (IC) chips, or a combination of discrete devices and one or more IC chips. In one embodiment of the invention, for example, the AC/DC converter 102, AC measuring unit 104 and SSL driver 106 are all formed in a single IC chip and the one or more light-emitting devices 108-1, 108-2, ..., 108-n is/are discrete LEDs. In another embodiment the SSL driver 106 comprises a dedicated SSL driver IC chip and the remaining components of the SSL system 10 are implemented using one or more other IC chips or a combination of one or more IC chips and discrete devices.

Figure 2:
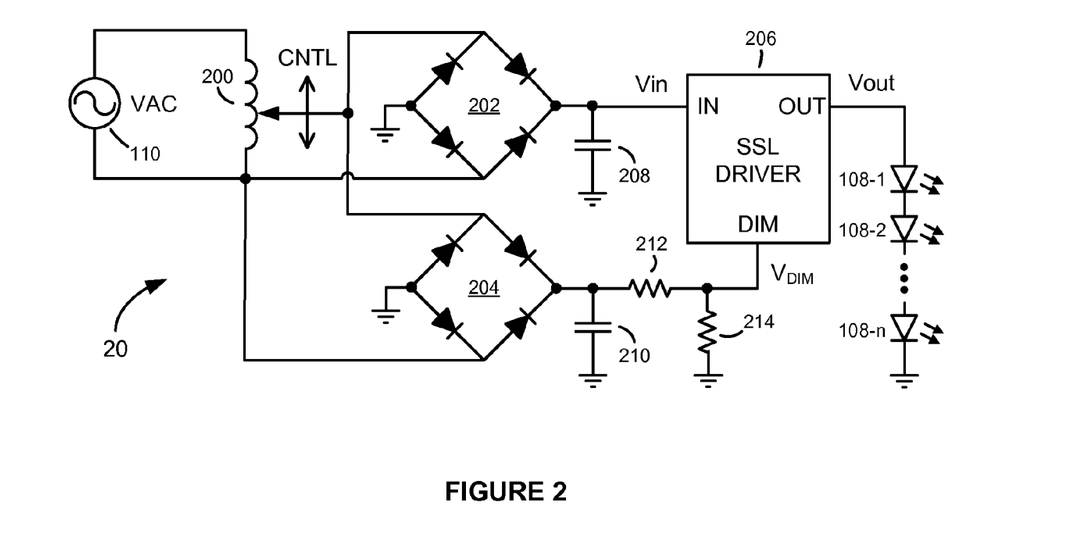
FIG. 2 is a schematic drawing of a solid-state lighting (SSL) system with dimming capability, according to an embodiment of the present invention.

FIG. 2 is a schematic drawing of an exemplary SSL system 20 based on the SSL system 10 in FIG. 1. In this exemplary embodiment, a variable transformer such as, for example, a variable autotransformer 200 is used to implement the AC scaling unit 100, and first and second rectifiers 202 and 204 are used to implement the AC/DC converter 102 and AC measuring unit 104, respectively. In the exemplary embodiment described here, a variable autotransformer 200 is used to perform the AC scaling. However, those of ordinary skill in the art will readily appreciate and understand that any suitable AC scaling device or circuit may be used. In the description of the exemplary embodiment that follows, it will be assumed that a variable autotransformer 200 is used to implement the AC scaling unit 100. The variable autotransformer, which is sometimes referred to as a "variac," has a single winding with primary and secondary coils having a number of winding turns in common, such that portions of the same winding act as the primary and secondary sides of the transformer. The primary side is connected to the AC power source 110. The secondary is formed by an electrical contact to one of a plurality of taps formed along the winding, thereby providing a plurality of different turns ratios, or, alternatively, by a brush that is configured to slide continuously along exposed portions of the winding coils, thereby providing a continuously variable turns ratio. Which tap the secondary is connected to or which position the brush is positioned is determined by the AC scaling control signal CNTL.

The first rectifier 202 and first smoothing capacitor 208 operate on the scaled AC voltage to produce the DC power voltage Vin, which is applied to the input IN of the SSL driver 206. The second rectifier 204 and second smoothing capacitor 210 produce the dim control signal $V_{DIM}$ for the SSL driver 206. The optional voltage divider formed by resistors 212 and 214 is used to reduce the DC level of the dim control signal $V_{DIM}$ to a level that is compatible with the input voltage range of the SSL driver 206.

Figure 3:
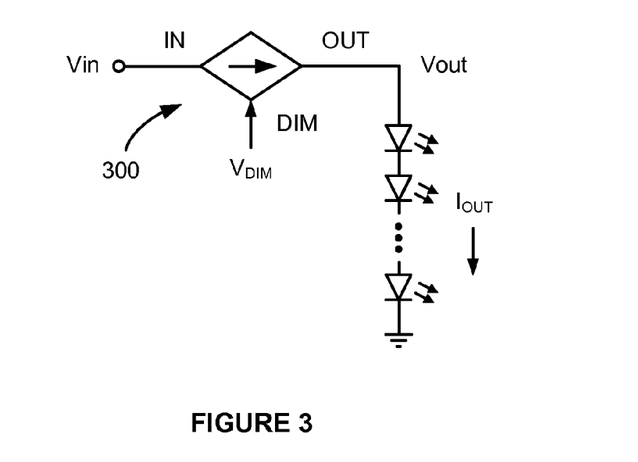
FIG. 3 is a schematic drawing illustrating how a controlled current source that is responsive to the dim control signal $V_{DIM}$ generated based on a scaled AC power signal may be employed to control dimming of the light-emitting load of the SSL system in FIG. 1 (or FIG. 2)

According to one embodiment of the invention, the SSL driver 206 comprises a controlled current source 300, as depicted in the simplified schematic drawing in FIG. 3. The controlled current source 300 has an input IN, an output OUT, and a control input DIM. The DC input voltage Vin produced by the AC scaling unit 100 (variable autotransformer 200 in FIG. 2) and AC/DC converter 102 (first rectifier 202 in FIG. 2) is applied to the input IN; the one or more light-emitting devices 108-1, 108-2, ..., 108-n are connected to the output OUT; and the dim control signal $V_{DIM}$ generated by AC measuring unit 104 (second rectifier 204 in FIG. 2) is applied to the control input DIM.

The output current $I_{OUT}$ flowing through the one or more light-emitting devices 108-1, 108-2, ..., 108-n and, consequently, the brightness of the light emitted by the one or more light-emitting devices 108-1, 108-2, ..., 108-n is determined by the value of the dim control signal $V_{DIM}$, which, in turn, and as explained above, is determined based on the extent to which the AC scaling unit 100 has scaled the AC input voltage VAC.

Figure 4:
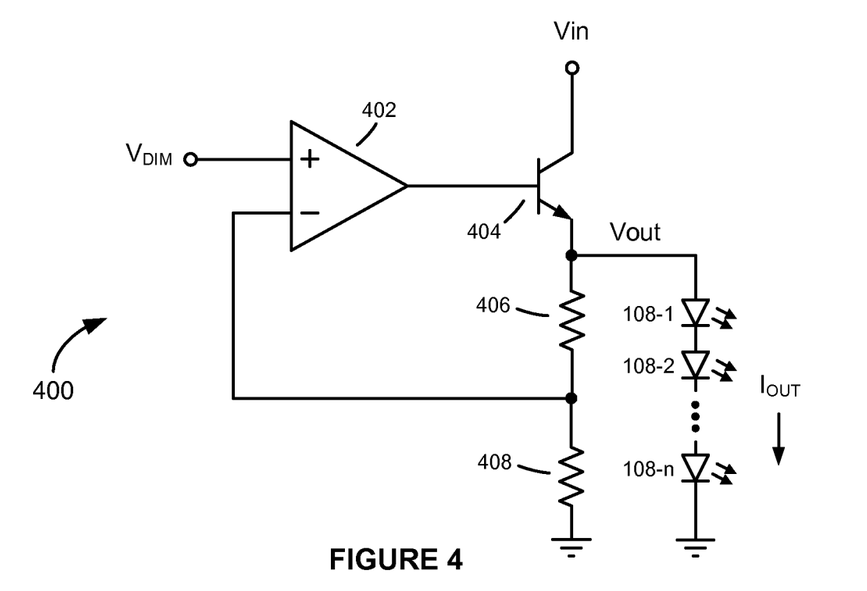
FIG. 4 is a schematic drawing of a voltage regulator that may be employed to set and control the voltage dropped across and current flowing through the light-emitting load of the SSL system in FIG. 1 (or FIG. 2), depending on the dim control signal $V_{DIM}$ generated by the AC measuring unit.
Figure 5:
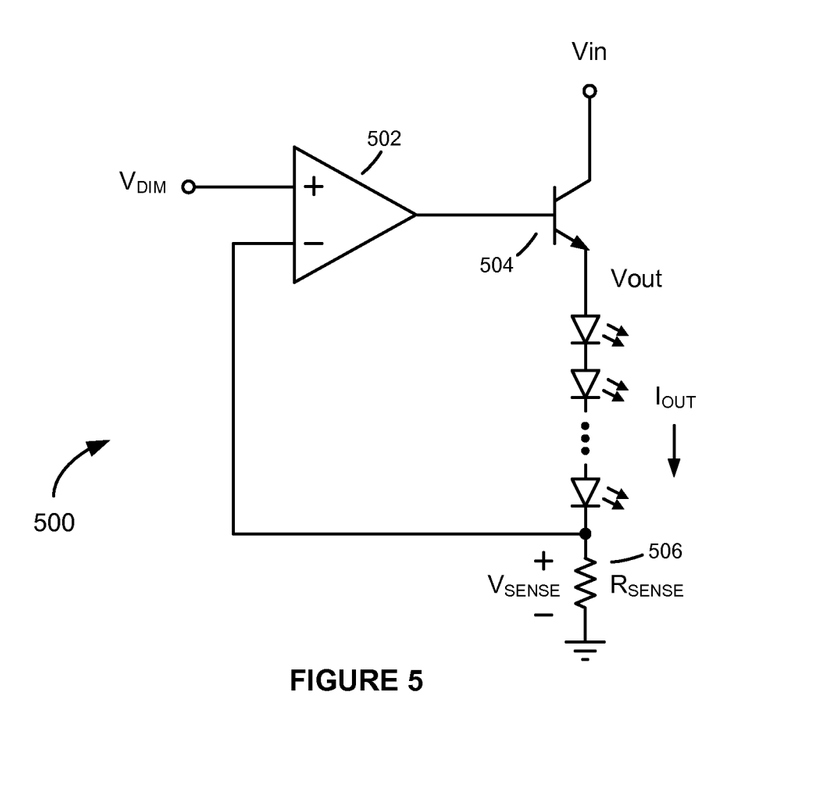
FIG. 5 is a schematic drawing of a current regulator that may be employed to set and control the magnitude of current flowing through the light-emitting load of the SSL system in FIG. 1 (or FIG. 2), depending on the dim control signal $V_{DIM}$ generated by the AC measuring unit.

The controlled current source 300 may be voltage-controlled or current-controlled and can be implemented in various different ways. For example, as illustrated in FIGS. 4 and 5, a voltage regulator 400 or current regulator may be employed. Normally, use of a regulator would prevent dimming to be achieved since by its very nature a regulator operates to maintain its output at a constant level despite any variation of its input. However, in accordance with the present invention, by measuring the scaled AC voltage produced at the output of the AC scaling unit 100, generating a dim control signal $V_{DIM}$ based on the measurement, and utilizing the generated dim control signal $V_{DIM}$ as a reference for the regulator, dimming can be achieved while still providing a regulated output. As illustrated in FIG. 4 the voltage regulator 400 may comprise an operational amplifier ("op-amp") 402 and pass transistor 404. The op-amp 402 serves as an error amplifier that continually adjusts its output voltage so that the voltages at its inverting and non-inverting inputs are forced to the same value. The output voltage $V_{OUT}$ of the regulator 400 is variable, depending on the value of the dim control signal $V_{DIM}$. As the dim control signal $V_{DIM}$ is reduced, the op-amp 402 reduces the base drive to the pass transistor 404, causing the output voltage $V_{OUT}$ to drop and, correspondingly, the current $I_{OUT}$ through the one or more light-emitting devices 108-1, 108-2, ..., 108-n to decrease. The lower current results in dimming of the light emitted by the one or more light-emitting devices 108-1, 108-2, ..., 108-n. As the voltage regulator 400 regulates the output voltage $V_{OUT}$ for a particular setting of the dim control signal $V_{DIM}$, a portion of the output voltage $V_{OUT}$ is fed back to the inverting input of the op-amp 402, via the voltage divider formed by resistors 406 and 408. If the difference (i.e., "error") between the fed-back voltage and the dim control signal $V_{DIM}$ has not been reduced to zero, the op-amp 402 adjusts the base drive of the pass transistor 404 until the error is reduced to zero by the feedback process. The voltage regulator 400 regulates the output voltage $V_{OUT}$ to different levels, depending on the value of the dim control signal $V_{DIM}$. In this manner a range of dimming levels is achieved.

Instead of using a voltage regulator to implement the controlled current source 300, a current regulator 500 may be employed, similar to as illustrated in FIG. 5. Like the op-amp 402 in the voltage regulator 400 in FIG. 4, the op-amp 502 in the current regulator 500 in FIG. 5 operates to force the voltages at its inverting and non-inverting inputs to be the same. However, rather than regulating the output voltage $V_{OUT}$, the current $I_{OUT}$ flowing through the one or more light-emitting devices 108-1, 108-2, ..., 108-n, which is equal to $V_{DIM}/R_{SENSE}$ (ignoring the small base current), is regulated. As the dim control signal $V_{DIM}$ is reduced, the op-amp 502 adjusts the base drive to the pass transistor 504 so that the current $I_{OUT}$ is reduced, thereby dimming the light emitted by the one or more light-emitting devices 108-1, 108-2, ..., 108-n. The current $I_{OUT}$ is reduced until the voltage $V_{SENSE}$ dropped across current sense resistor 506 is equal to the voltage of the dim control signal $V_{DIM}$. This feedback and control process forces the output current $I_{OUT}$ to be maintained (i.e., regulated) at a constant value, until the value of $V_{DIM}$ changes. A different current $I_{OUT}$ is set and maintained for each setting of the dim control signal $V_{DIM}$. Accordingly, a range of dimming levels is achieved.

Figure 6:
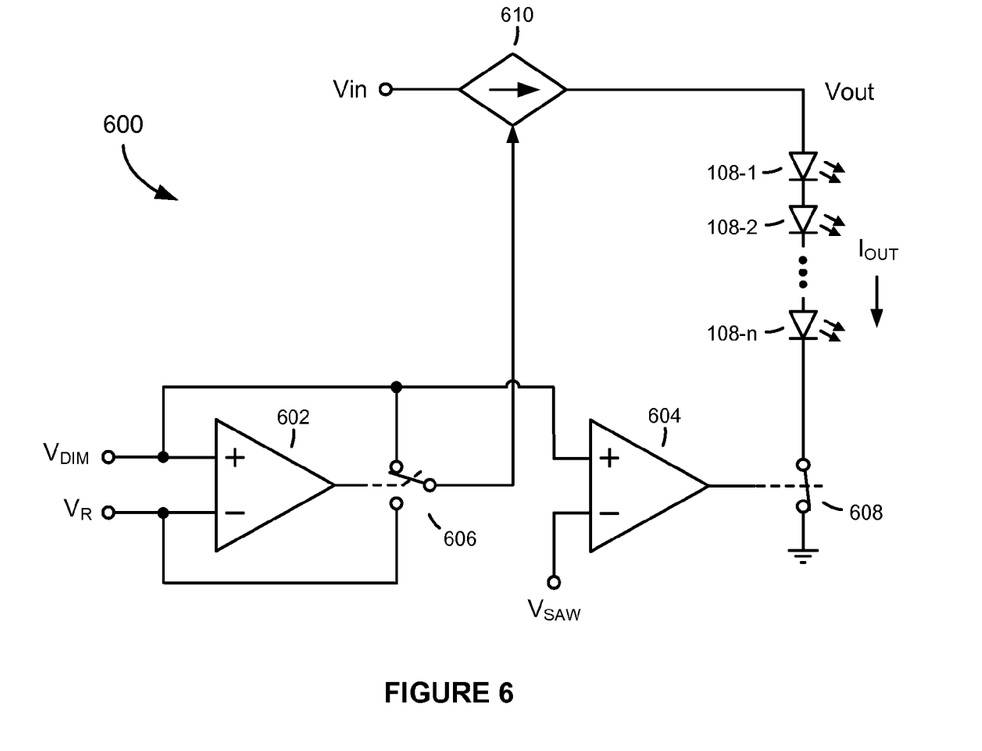
FIG. 6 is a schematic drawing of a circuit that may be included in the SSL driver of the SSL system in FIG. 1 (or FIG. 2) to perform both current-control-based dimming and pulse-width modulation (PWM) based dimming, in accordance with an embodiment of the present invention.

In the exemplary embodiments of the invention described above, dimming is performed exclusively by controlling the magnitude of the current flowing through the one or more light-emitting devices 108-1, 108-2, ..., 108-n. According to another embodiment of the invention, that same "current control" approach is employed to realize dimming over a first range of dimming levels and pulse-width modulation (PWM) is employed over a second range of dimming levels. The added second dimming range provided by PWM widens the overall dimming range and allows dimming to be extended to levels not realizable using the current control approach alone. FIG. 6 is a schematic drawing of an SSL driver 600 that is configured to control dimming, according to this embodiment of the invention. The SSL driver 600 comprises a first comparator 602, a second comparator 604, first and second switches 606 and 608, and a controlled current source 610. The first comparator 602 is configured to continuously compare the dim control signal $V_{DIM}$ to a threshold voltage (i.e., voltage reference) $V_R$. When $V_{DIM} > V_R$, the output state of the first comparator 602 controls the first switch 606 so that $V_{DIM}$ remains connected to the control input of the controlled current source 610, and the second comparator 604 maintains the second switch 608 in a closed (i.e., ON) position. Accordingly, when the dim control signal $V_{DIM}$ is set so that it is greater than the threshold voltage $V_R$, dimming is performed by controlling the magnitude of the current $I_{OUT}$ flowing through the one or more light-emitting devices 108-1, 108-2, ..., 108-n (i.e., using current-control-based dimming), similar to as described above.

PWM-based dimming is activated as soon as the first comparator 602 detects that the dim control signal $V_{DIM}$ has been adjusted to a value that is below the threshold voltage $V_R$. Upon detecting this transition, the first comparator 602 changes state, causing the first switch 606 to connect the threshold voltage $V_R$ (or some other constant voltage) to the control input of the controlled current source 610. Reducing $V_{DIM}$ further has no effect on the magnitude of the output current $I_{OUT}$, since the controlled current source 610, with its control input held constant, maintains the magnitude of the output current $I_{OUT}$ at a constant magnitude $I_0$. Nevertheless, further reduction in $V_{DIM}$ results in increased dimming, albeit by PWM rather than current-control-based dimming.

Figure 7:
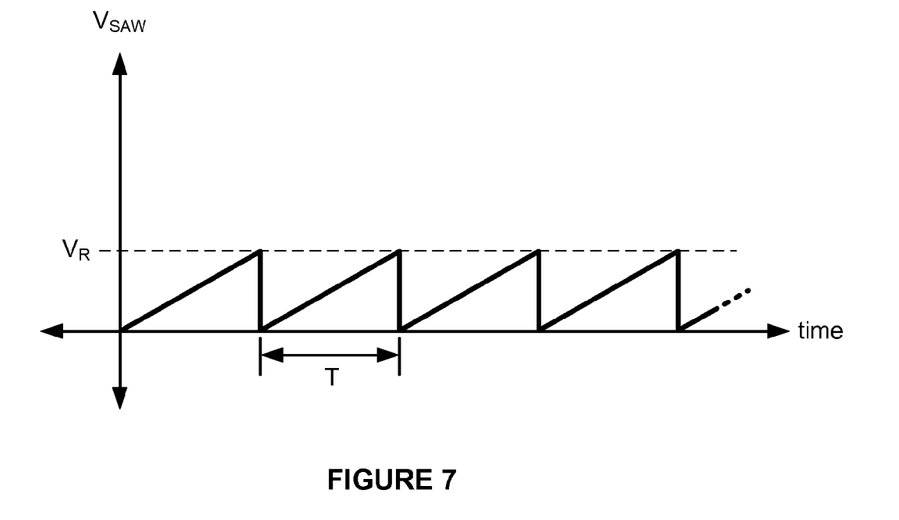
FIG. 7 is a signal diagram of a sawtooth waveform used by the PWM circuitry of the circuit in FIG. 6.
Figure 8A:
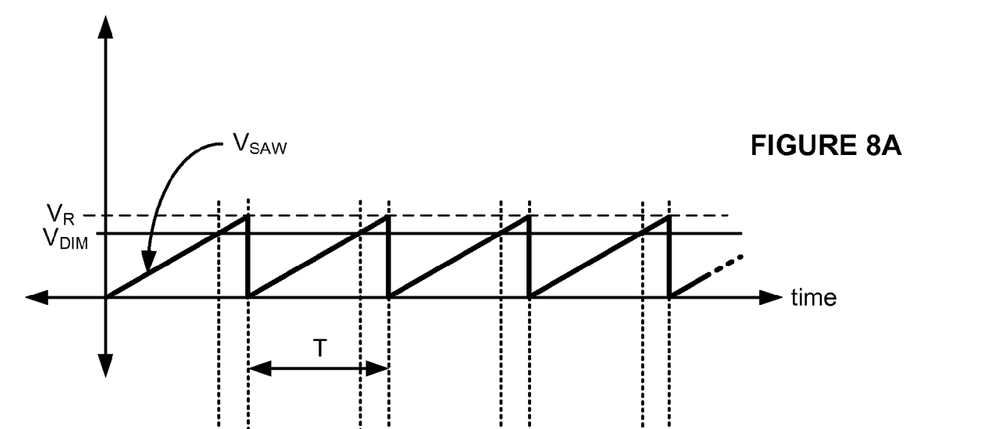
FIG. 8A is a signal diagram showing a threshold voltage $V_R$ and its relationship to the sawtooth waveform used by the PWM circuitry of the circuit in FIG. 6 for one setting of the dim control signal $V_{DIM}$.
Figure 8B:
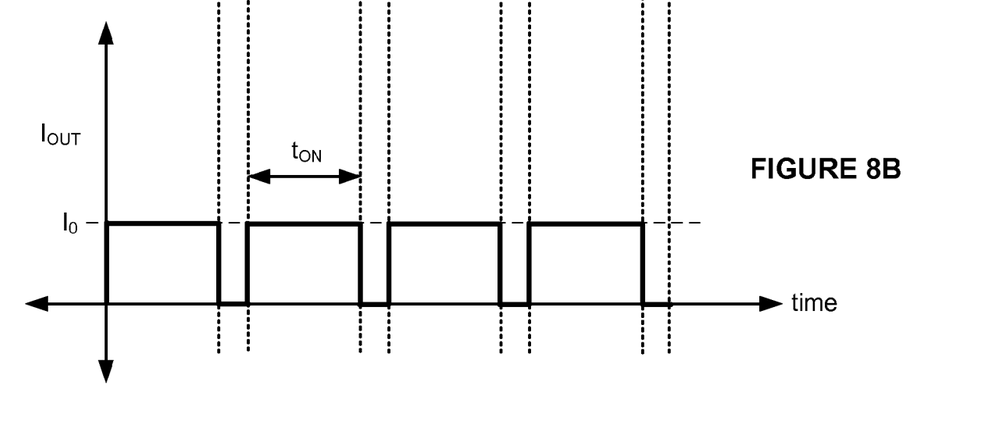
FIG. 8B is a signal diagram of the current $I_{OUT}$ results that flows through the light-emitting load of the SSL system in FIG. 1 or FIG. 2, illustrating how the PWM circuitry of the circuit in FIG. 6 periodically disrupts the current $I_{OUT}$ flowing through the light-emitting load to form an average current $\bar{I}_{OUT}=D \times I_0$.
Figures 9A, 9B:
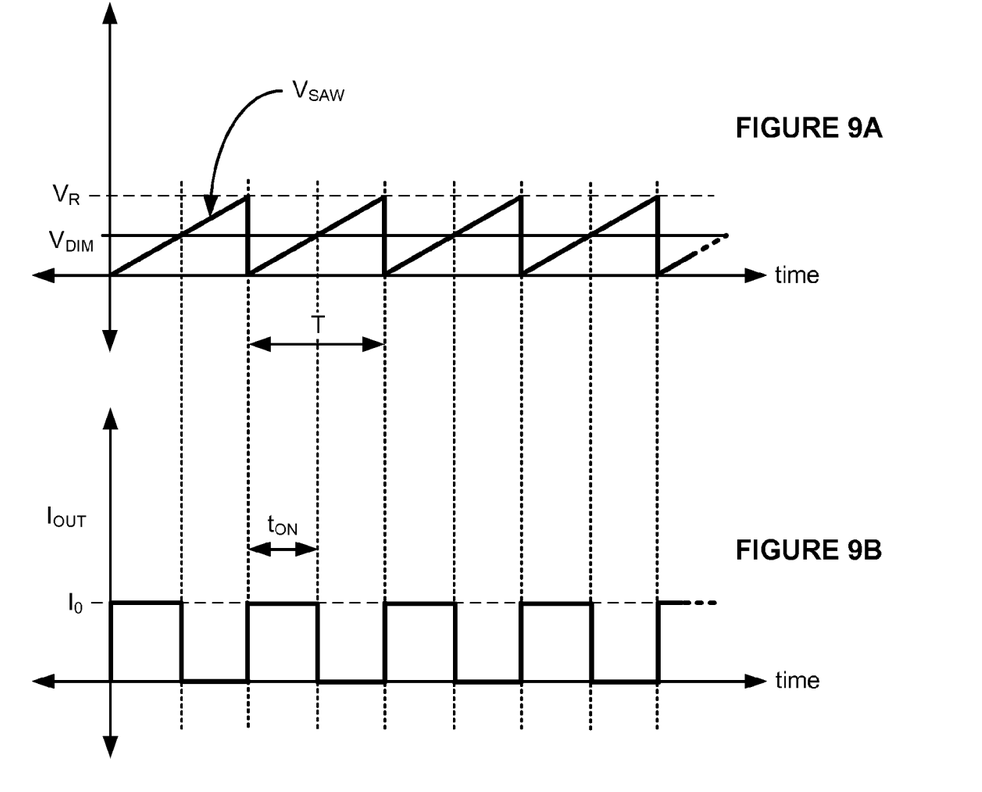
FIG. 9A is a signal diagram showing the threshold voltage $V_R$ and its relationship to the sawtooth waveform used by the PWM circuitry of the circuit in FIG. 6, similar to as in FIG. 8A but for a different setting of the dim control signal $V_{DIM}$.
FIG. 9B is a drawing of the current $I_{OUT}$ flowing through the light-emitting load, illustrating how a lower value of the dim control signal $V_{DIM}$ (compared to that in FIG. 8A) results in a reduction in the duty cycle D and, consequently, a lower average current $\bar{I}_{OUT}=D \times I_0$ flowing through the light-emitting load.

PWM-based dimming is performed under the direction of the second comparator 604 and second switch 608. The second comparator 604 is configured to continuously compare the dim control signal $V_{DIM}$ to a sawtooth waveform $V_{SAW}$ (see FIG. 7). It maintains the second switch 608 in a closed (i.e., ON) position during all times it detects that $V_{DIM} > V_{SAW}$. As the dim control signal $V_{DIM}$ is reduced (see FIG. 8A) and upon detecting that $V_{DIM} < V_{SAW}$, the second comparator 604 changes its output state, causing the second switch 608 to open (i.e., turn OFF). The second switch 608 remains open until the second comparator 604 subsequently detects that $V_{DIM}$ has once again become greater than $V_{SAW}$, at which time the second comparator 604 again changes its output state and the second switch 608 is again closed. Opening and closing the second switch 608 in this manner results in the current $I_{OUT}$ flowing through the one or more light-emitting devices 108-1, 108-2, . . . , 108-$n$ to be periodically disrupted, as illustrated in FIG. 8B. Periodically disrupting $I_{OUT}$ results in a lower average current $\bar{I}_{OUT}$=D×$I_0$ flowing through the one or more light-emitting devices 108-1, 108-2, . . . , 108-$n$, where D, the "duty cycle," is equal to $t_{ON}$/T and $t_{ON}$ is the time during each period T that the second comparator 604 maintains the second switch 608 in the closed (ON) position. Decreasing the dim control signal $V_{DIM}$ further below the threshold voltage $V_R$ further reduces D, as can be seen by comparing FIGS. 8A and 8B to FIGS. 9A and 9B. Since the brightness of the light produced by the one or more light-emitting devices 108-1, 108-2, . . . , 108-$n$ is determined by the average current flowing through it/them and the duty cycle D, which determines the average current $\bar{I}_{OUT}$, is dependent on $V_{DIM}$, dimming is realized by simply reducing the value of $V_{DIM}$.

While various exemplary embodiments of the present invention have been illustrated and described in detail above, those of ordinary skill in the art will appreciate and understand that various changes in form and detail may be made without departing from the true spirit and scope of the invention. The scope of the invention should therefore not be restricted to the specifics of the exemplary embodiments described but instead determined by the words of the appended claims and the full scope of equivalents to which such claims are entitled.

What is claimed is:

1. A solid-state lighting (SSL) system having dimming capability, comprising:
    an alternating current to direct current (AC/DC) converter configured to convert a scaled non-phase-cut AC voltage to a DC voltage;
    a dim control signal generating circuit configured to generate a dim control signal based on said scaled non-phase-cut AC voltage; and
    an SSL driver configured to generate, based on said DC voltage, a DC supply voltage for powering a light-emitting load, said SSL driver including dim control circuitry configured to control the brightness of light emitted by said light-emitting load based on the dim control signal generated by said dim control signal generating circuit,
    wherein said dim control circuit com rises current control circuit configured to control the magnitude of current flowing through said light-emitting load depending on the value of said dim control signal and pulse-width modulation (PWM) circuit configured to periodically disrupt current flow through said light-emitting load, and said dim control circuitry is configured to employ said current control circuitry to control dimming of light emitted by said light-emitting load over a first range of dimming levels and is configured to employ said PMW circuitry to control dimming of light emitted by said light-emitting load over a second range of dimming levels.

2. The SSL system of claim 1, wherein said current control circuitry comprises a regulator having a voltage input configured to receive said DC voltage and a reference input configured to receive said dim control signal, said regulator operable to regulate and control the magnitude of current flowing through the light-emitting load depending on the value of said dim control signal.

3. The SSL system of claim 1, wherein said second dimming range extends to dimming levels lower than dimming levels within said first dimming range.

4. The SSL system of claim 1, further comprising n AC scaling unit configured to scale a magnitude of a non-phase-cut AC input voltage provided by an AC power source and produce said scaled non-phase-cut AC voltage.

5. A solid-state lighting (SSL) driver for an SSL system, comprising:
    dimming control circuitry configured to control, depending on the value of an externally applied dim control signal with respect to a predetermined threshold, whether to perform dimming of light emitted by a light-emitting load using current-control-based dimming or pulse-width modulation (PWM) based dimming;
    current control circuitry that is, during times said dim control signal has a value greater than said predetermined threshold, configured to control and vary, depending on the value of the externally applied dim control signal, the magnitude of current flowing through a light-emitting load, and is, during times said dim control signal has a value that is less than said predetermined threshold, configured to maintain the current flowing through the light-emitting load at a constant magnitude; and
    PWM circuitry configured to control dimming of said light-emitting load during times said dim control signal has a value less than said predetermined threshold, said PWM circuitry configured to perform dimming of the light emitted by said light-emitting load by periodically disrupting the current flowing through said light-emitting load.

6. The SSL driver of claim 5, wherein said current control circuitry comprises a regulator configured to regulate and control the magnitude of current flowing through the light-emitting load depending on the value of said dim control signal.

7. The SSL driver of claim 5, wherein said current control circuitry is configured to perform dimming of said light-emitting load over a first dimming range and said PWM circuitry is configured to perform dimming of said light-emitting load over a second dimming range that extends to dimming levels lower than dimming levels within said first dimming range.

8. The SSL driver of claim 5, wherein said current control circuitry comprises a controlled current source and said dimming control circuitry comprises a comparator configured to compare said dim control signal to said predetermined threshold and a switch controlled by said comparator to couple the control input of said controlled current source to either said dim control signal or to some other constant reference signal depending on the comparator's comparison of the dim control signal to the predetermined threshold.

9. A method of controlling the brightness of light produced by a light-emitting load in a solid-state lighting (SSL) system, comprising:
    converting a scaled non-phase-cut AC voltage to a direct current (DC) voltage;
    applying said DC voltage to a DC supply input of an SSL driver;
    separate from converting said scaled non-phase-cut AC voltage to said DC voltage, forming a dim control signal based on said scaled non-phase-cut AC voltage;

applying said dim control signal to a dim control input of said SSL driver;

supplying DC power to a light-emitting load from a DC supply output of said SSL driver; and dimming the light produced by said light-emitting load based on the dim control signal applied to the dim control input of said SSL driver, said dimming the light comprising controlling a magnitude of current flowing through the light-emitting load for dimming levels within a first dimming range and periodically disrupting current flowing through said light-emitting load for dimming levels within a second dimming range.

10. The method of claim 9, wherein said second dimming range extends to dimming levels lower than dimming levels within said first dimming range.

11. A method of controlling dimming of light emitted by a light-emitting load, comprising:

generating a DC supply voltage from said scaled non-phase-cut power signal;

applying said DC supply voltage across a light-emitting load;

generating a dim control signal based on said scaled non-phase cut power signal; and controlling dimming of light emitted by said light-emitting load using said dim control signal, wherein controlling dimming of the light emitted by said light-emitting load comprises controlling a magnitude of current flowing through the light-emitting load depending the value of said dim control signal to achieve dimming over a first range of dimming levels, and periodically disrupting current flowing through the light-emitting load while holding the magnitude of the current flowing through the light-emitting load constant to achieve dimming over a second range of dimming levels.

12. The method of claim 11, further comprising scaling a magnitude of a non-phase-cut power signal to produce said scaled non-phase-cut power signal.

13. The method of claim 12, wherein scaling a magnitude of a non-phase-cut power signal to produce said scaled non-phase-cut power signal comprises scaling a magnitude of a non-phase-cut alternating current (AC) power signal.

14. The method of claim 11, wherein generating said dim control signal comprises measuring a voltage of said scaled non-phase-cut power signal and generating said dim control signal based on the measured voltage.

15. The method of claim 14, wherein controlling dimming of light emitted by said light-emitting load comprises applying said scaled non-phase-cut power signal to an input of a regulator and applying said dim control signal to a reference input of said regulator.

16. The method of claim 11, wherein said second range of dimming levels extends to dimming levels lower than dimming levels within said first range of dimming levels.

17. The SSL system of claim 4, wherein said AC scaling unit comprises a variable transformer.

18. The method of claim 9, further comprising scaling a magnitude of a non-phase-cut alternating current (AC) voltage provided by an AC power source to produce said scaled non-phase-cut AC voltage.

19. The method of claim 13, wherein scaling the magnitude of said non-phase-cut AC power signal is performed using a variable transformer.

* * * * *

UNITED STATES PATENT AND TRADEMARK OFFICE
CERTIFICATE OF CORRECTION

| | | |
|---|---|---|
| PATENT NO. | : 9,179,508 B2 | Page 1 of 1 |
| APPLICATION NO. | : 14/152089 | |
| DATED | : November 3, 2015 | |
| INVENTOR(S) | : Earl W. McCune, Jr. | |

It is certified that error appears in the above-identified patent and that said Letters Patent is hereby corrected as shown below:

In the claims

Claim 1:

Lines 15-16, "com rises current control circuit" should be -- comprises current control circuitry --.

Line 18, "the value" should be -- a value --.

Line 19, "circuit" should be -- circuitry --.

Claim 4:

Line 1, "comprising n AC" should be -- comprising an AC --.

Claim 11:

Line 3, "said" should be -- a --.

Line 14, "depending the value" should be -- depending on a value --.

Signed and Sealed this
Twenty-fourth Day of May, 2016

Michelle K. Lee
*Director of the United States Patent and Trademark Office*